United States Patent [19]
Komura et al.

[11] Patent Number: 6,072,552
[45] Date of Patent: Jun. 6, 2000

[54] LIQUID CRYSTAL DISPLAY

[75] Inventors: Shinichi Komura, Hitachi; Yuji Mori, Ibaraki; Junichi Hirakata, Mobara; Masahiko Ando, Hitachi; Osamu Itou, Hitachi; Ikuo Hiyama, Hitachi, all of Japan

[73] Assignee: Hitachi, Ltd., Tokyo, Japan

[21] Appl. No.: 09/051,073

[22] PCT Filed: Oct. 6, 1995

[86] PCT No.: PCT/JP95/02055

§ 371 Date: Apr. 2, 1998

§ 102(e) Date: Apr. 2, 1998

[87] PCT Pub. No.: WO97/13124

PCT Pub. Date: Jan. 10, 1997

[51] Int. Cl.[7] .............................. G02F 1/1333; G02F 1/13
[52] U.S. Cl. .................................. 349/86; 349/88; 349/90; 349/187
[58] Field of Search .................................. 349/86, 88, 90, 349/187

[56] References Cited

U.S. PATENT DOCUMENTS

| | | | |
|---|---|---|---|
| 5,194,973 | 3/1993 | Isogai et al. | 359/53 |
| 5,327,271 | 7/1994 | Takeuchi et al. | 359/75 |
| 5,372,745 | 12/1994 | Yoshinaga et al. | 252/299.01 |
| 5,784,136 | 7/1998 | Ando et al. | 349/86 |
| 5,903,330 | 5/1999 | Funfschilling et al. | 349/129 |

*Primary Examiner*—William L. Sikes
*Assistant Examiner*—Tarifur R. Chowdhury
*Attorney, Agent, or Firm*—Antonelli, Terry, Stout & Kraus, LLP

[57] ABSTRACT

A liquid crystal layer comprising a liquid crystal display has first and second liquid crystal gel layers orientated so that polymer threads are of fixed directions within a dichroic liquid crystal. The direction of orientation of the polymer threads included in the first liquid crystal gel layer and the direction of orientation of the polymer threads included in the second liquid crystal gel layer are orthogonal with respect to each other.

26 Claims, 7 Drawing Sheets

(1) COATING LIQUID CRYSTAL
 + DICHROIC DYE
 + PRE-POLYMER BY A SPINNER (2) POLYMERIZING BY POLARIZED UV IRRADIATION (3) OVERLAID SO AS TO BE ORTHOGONAL

LIQUID CRYSTAL DISPLAY

BACKGROUND OF THE INVENTION

The present invention relates to a liquid crystal display, and more particularly relates to achieving a bright display without using a backlight.

Various liquid crystal display elements have been proposed and put to practical use as display elements for displaying information. Currently, a TN mode (Twisted Nematic; Japanese Patent Laid-open Publication No. Sho. 47-11737 (1972) and an STN mode (Super Twisted Nematic; Japanese Patent Laid-open Publication No. Sho. 60-107020 (1985)) are typical modes that are used in nematic liquid and these modes are widely employed.

In the TN mode, the direction of alignment of the liquid crystal molecules is twisted by 90 degrees when no voltage is applied. Light incident to this element is then polarized by the twisted structure of the liquid crystal and by birefringence, and polarized light is emitted. On the other hand, when a voltage is applied to the liquid crystal layer, the liquid crystal molecules become aligned in the direction of the voltage, less double diffraction occurs and incident light is emitted without being polarized. By adopting a structure where this liquid crystal layer is sandwiched between two light polarizing plates, changes in the optical properties of the liquid crystal layer (changes in the polarized state) can be observed as changes in the strength of the emitted light.

In the STN mode the direction of orientation of the liquid crystal molecules is twisted by about 240 degrees, which is large compared with TN the mode. Changes in the optical properties of the liquid crystal layer (changes in the polarized state) can be observed as changes in the strength of the emitted light in this mode also by adopting a structure where this liquid crystal layer is sandwiched between two light polarizing plates.

Contrast between light and dark can then be obtained based on this operation theory in the TN and STN modes.

These display methods have the advantages of using remarkably little power, as compared with CRTs (Cathode Ray Tubes), and can be provided in the form of thin display panels. This display method is widely used in information processing equipment, such as personal computers and word processors.

However, because this method employs light polarizing plates as a matter of necessity, about half of the incident light is not transmitted by the liquid crystal display element. In reality therefore, a large number of liquid crystal displays are provided with light sources (backlights) at the rear of the liquid crystal display element to maintain brightness. The amount of light transmitted by the liquid crystal displays provided with color filters for information in color is even lower, and these displays therefore have to be provided with extremely powerful backlights. As the power consumed by the backlight is even greater than the power consumed by the driver circuit for driving the liquid crystal display element, this kind of display is not suitable as a display for portable information equipment that use batteries to provide power. There is then a trade-off in the related liquid crystal display method between brightness and power consumption, and a bright reflective liquid crystal display element that does not require a backlight is therefore preferred.

It is also preferable to obtain a reflective liquid crystal display element without a fluorescent backlight from the point of view of eye fatigue in the case of continued viewing of the display.

Liquid crystal display elements that do not use light polarizing plates have therefore been proposed in response to these problems, of which the "White-Taylor liquid crystal display" is typical (refer to J. Appl. Phys. 45, pp.4718–4723 (1974)). Here, a cholesteric liquid crystal to which dichroic dye is added is orientated substantially parallel to the faces of the plates. The dichroic dye then efficiently absorbs light because of spontaneous twisting of the cholesteric liquid crystal when there is no voltage applied. Absorption of transmitted light by the dichroic dye does not occur, however, when a voltage is applied because the liquid crystal molecules become oriented in the direction of the voltage (vertically with respect to the plate). In this way, a liquid crystal display element that is both bright and has a high contrast ratio can theoretically be realized without using light polarizing plates. However, it is necessary to make the pitch of the twist of the chloresteric liquid crystal be in the order of the wavelength of light in order to achieve a high contrast ratio, but if the pitch is made short, a large number of line defects, referred to as disclination lines, occur and hysteresis or delayed response is caused. This kind of problem means that widespread use of such a liquid crystal display element is not possible. A PCGH (Phase Change Guest Host) mode has also been proposed as a method of improving the White-Taylor type display element (SID 92 Digest, pp. 437–440 (1992)). Here, disclination does not occur because the cholesteric twist pitch has been made long. Further, reflectivity when a voltage is applied is made high by carrying out a vertical orientation process at a plate surface boundary. However, the hysteresis is substantial and the absorption efficiency is low when there is no voltage applied because the twist pitch is long compared with the wavelength.

A further typical display method that does not employ light polarizing plates is the PDLC (Polymer Dispersed Liquid Crystal; refer to Japanese Patent Laid-open Publication No. 58-601631 (1983)).

In this method, droplets of nematic liquid crystal of positive dielectric anisotropy that are only a few microns in diameter are dispersed within a polymer matrix. Here, the usual refractive index and the polymer refractive index of the liquid crystal are selected to be approximately the same. Liquid crystal molecules are then orientated in an irregular manner within the droplets when no voltage is applied and the directions of orientation vary between droplets. This means that differences in refractive index occur between the droplets and the polymer, with light being scattered as a result. When a voltage is then applied, the liquid crystal molecules become oriented in the direction of the voltage. Scattering of light incident in the direction of the voltage then does not occur because the usual refractive index and the polymer refractive index of the liquid crystal at this time are approximately the same. Light polarizing plates are therefore not necessary for this kind of operating theory. However, the scattering occurring in this mode is not so substantial and a sufficiently bright display is not obtained.

A method of adding dichroic dye to a PDLC liquid crystal (Guest Host PDLC method) has also been proposed (Japanese Patent Laid-open Publication No. Sho. 59-178429 (1984)). Here, the absorption efficiency is low because there is a large number of liquid crystal molecules that are not oriented so as to be parallel with the plate when there is no voltage applied as compared to the White-Taylor method described previously. However, the hysteresis is small compared with the White-Taylor method and the PCGH method and the response is also fast.

Japanese Patent Laid-open Publication No. Hei. 4-199024 (1992) describes a method for improving the absorption efficiency of this Guest Host PDLC method. This technology is configured in such a manner that two guest host PDLC layers with liquid crystal molecules orientated in one direction almost parallel to the plates are overlaid so that the direction of orientation of one layer is orthogonal to the direction of orientation of the other layer. The absorption efficiency is therefore good because the axes for absorbing light between the layers are orthogonal. PDLCs where liquid crystal molecules are oriented in one direction are usually made by extending an ordinary PDLC film in a uniaxial direction. Liquid crystal molecules then also become orientated in this direction because the droplets are also uniaxially extended. However, liquid crystal molecules that are not exactly parallel with the direction of extension also exist within the extended droplets and the absorption efficiency is therefore not good with the White-Taylor method etc.

SUMMARY OF THE INVENTION

It is therefore the object of an present invention to provide a bright liquid crystal display with a high contrast ratio.

A liquid crystal layer comprising a liquid crystal display of the present invention has first and second liquid crystal gel layers each with polymer threads aligned in a fixed direction within a dichroic liquid crystal. The direction of orientation of the polymer threads included in the first liquid crystal gel layer and the direction of orientation of the polymer threads included in the second liquid crystal gel layer are orthogonal with respect to each other.

It is preferable for the liquid crystal comprising the liquid crystal layer to be a nematic liquid crystal. It is also preferable to obtain a dichroic liquid crystal by mixing dichroic dye into the liquid crystal of the liquid crystal gel layers.

A polymer liquid crystal or diacrylate group polymers can be used as the polymer threads.

Each plate of the pair of plates has an orientation film, with the direction of orientation of these orientation films being orthogonal with respect to each other.

The liquid crystal layer has an intermediate layer between the first and second liquid crystal gel layers. There are no polymer threads at this intermediate layer and this intermediate layer is comprised of a twisted liquid crystal layer in which the liquid crystal is twisted. It is preferable for the product $\Delta n d$ of anisotropy $\Delta n$ of the refractive index of the twisted liquid crystal layer and the thickness d to be 0.3 or less. It is also possible for the ratio $\epsilon p/dp$ of a dielectric constant $\epsilon p$ and the thickness dp of the intermediate layer to be ten times or more than the ratio $\epsilon 1/d1$ of the dielectric constant $\epsilon 1$ of said liquid crystal gel layer and the thickness d1 of the two layers.

A switching element can be formed on one of the pair of plates in such a manner as to be connected to the electrode formed on this one plate, and the voltage can then be controlled by turning the switching element on and off.

According to the present invention, polymer threads are orientated in substantially one direction within the liquid crystal with dichroic dye mixed in. The liquid crystal and the dichroic dye then become aligned along the direction of alignment of the polymer threads when there is no voltage applied. At this time, the rate of absorption is high if the direction of orientation of the polymer threads of each of the two layers are orthogonal with respect to each other because the dichroic dyes will also be orthogonal with respect to each other. As there is just a small amount of polymer, when a voltage is applied the liquid crystal molecules and the dichroic dye of both layers, both become orientated in the direction of the voltage, and the light is therefore not absorbed. Therefore abright liquid crystal display with a high contrast ratio can be realized by using this configuration.

BEST MODE FOR CARRYING OUT THE INVENTION

Figure 1:
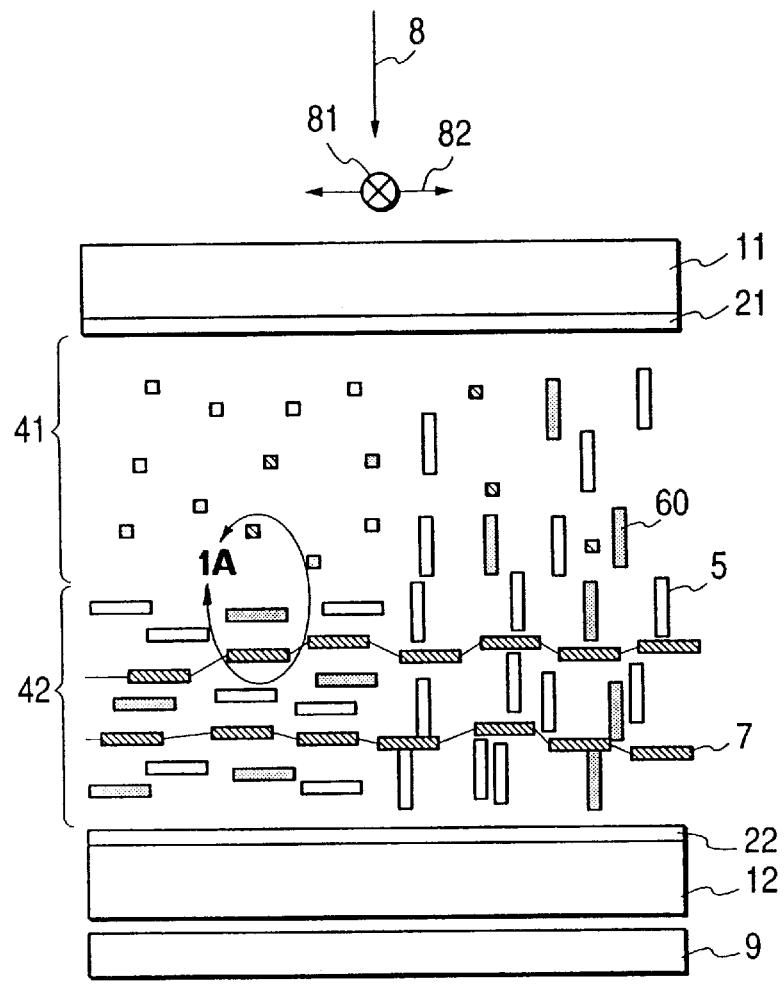
FIG. 1 is a schematic cross-sectional view showing the configuration of a liquid crystal display element representing a first embodiment of the present invention and FIG. 1A is an enlarged view of a portion thereof.

The following is a description, referring to the drawings, of various embodiments of the present invention.

The configuration of a first embodiment of the present invention is shown in FIG. 1. In FIG. 1, two liquid crystal gel layers 41 and 42 are sandwiched between transparent plates 11 and 12 on which transparent electrodes 21 and 22 are formed. The liquid crystal gel is comprised of liquid crystals 5, dichroic dyes 60 and polymer threads 7. Glass is employed as the plates, but plastic can also be used. Nematic liquid crystal having positive dielectric anisotropy is used as the liquid crystal.

Figure 1A:
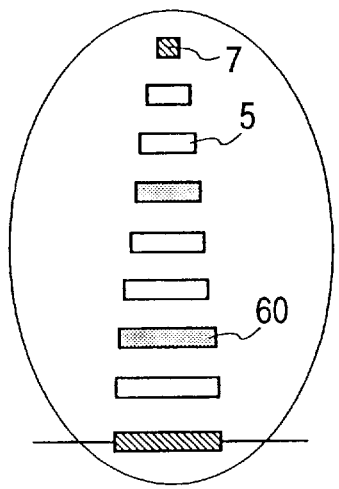

The polymer threads are substantially orientated in one direction at each of the liquid crystal gel layers 41 and 42, with the directions at each of the liquid crystal gel layers 41 and 42 being orthogonal with respect to each other. The liquid crystals 5 and the dichroic dyes 60 are orientated along the polymer threads at each of the liquid crystal gel layers as shown in enlarged view in FIG. 1A.

When there is no voltage applied, as shown in the left half of FIG. 1, a component 81 of light, which is incident natural light 8 and is parallel to the polymer threads, is absorbed at the liquid crystal gel layer 41. Further, a component 82 of light parallel to the polymer threads is also absorbed in a similar manner at the liquid crystal gel layer 42. Light reflected by a reflector 9 is also then absorbed by the liquid crystal gel layers 41 and 42 in the same manner. The light reflectivity which corresponds to the absorption wavelength of the dichroic dye is therefore at an extremely low value.

When a voltage is applied, as shown in the right half of FIG. 1, the liquid crystals 5 and the dichroic dye 60 become orientated in the direction of the voltage. In this case, most of the incident natural light 8 is not absorbed because it's light component is orthogonal to the absorption axes of the dichroic dye. Most of the light reflected by the reflector 9 is also similarly not absorbed. Light reflectivity corresponding to the absorption wavelength of the dichroic dyes therefore becomes an extremely high value.

According to this first embodiment, high reflectivity and a high contrast ratio can be achieved.

A method of manufacturing a reflective liquid crystal display element of the first embodiment will now be described reference to FIG. 2.

(1) Liquid crystals 5 with dichroic dye 60 added thereto and a small amount of pre-polymer 71 are applied onto an electrode 2 on a plate 1. A material comprising polymer threads that are parallel to the direction of polarization of irradiating light, when irradiated with light, is selected as the pre-polymer 71. (2) The pre-polymer is then polymerized by irradiation with polarized light 85. (3) This is then overlaid with another element made in the same way so that an illuminated direction 86 of the polarized light is orthogonal. At this time, if the desired liquid crystal is again injected after the liquid crystal after polymerization is extracted, deterioration in the liquid crystal due to AV exposure can be prevented.

Figure 3:
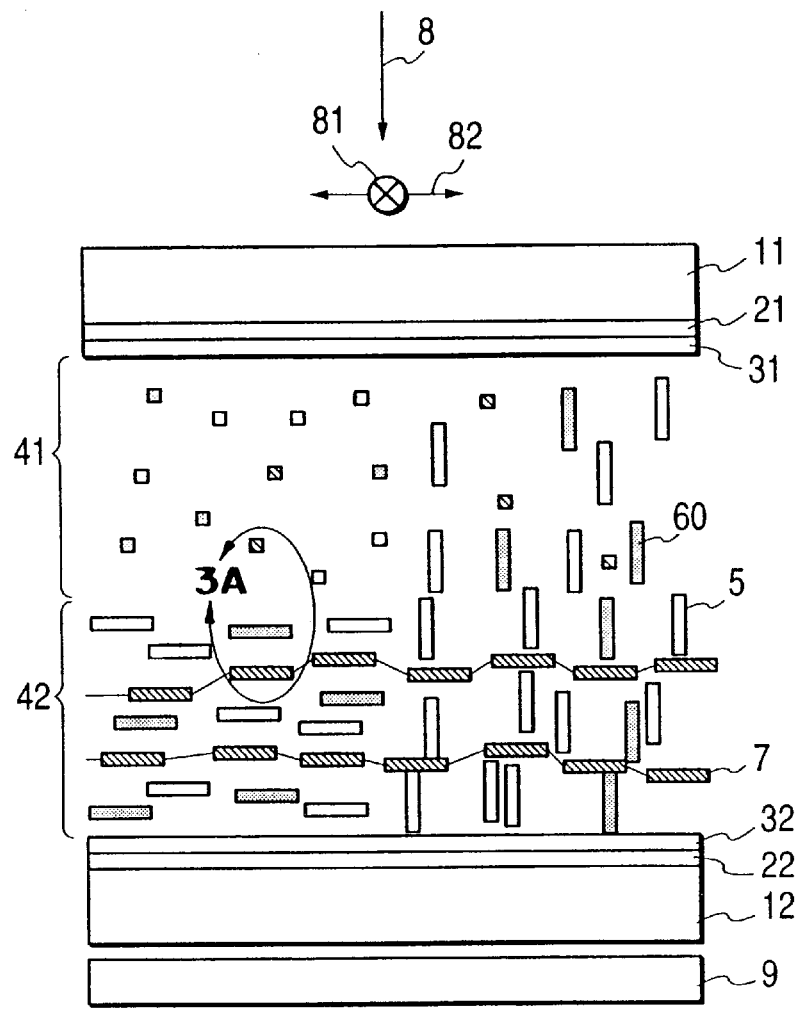
FIG. 3 is a schematic cross-sectional view showing the configuration of a liquid crystal display element representing a second embodiment of the present invention and FIG. 3A is an enlarged view of a portion thereof.
Figure 3A:
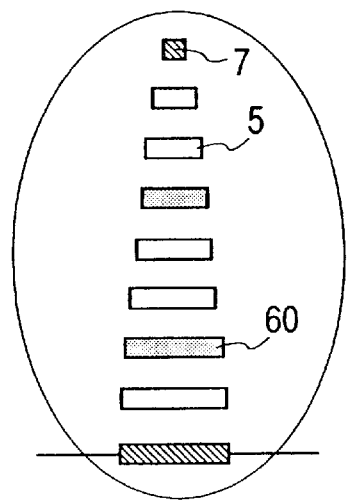

The configuration of a second embodiment of the present invention is shown in FIG. 3. This second embodiment comprises a two-layer liquid crystal gel element formed of two liquid crystal gel layers 41 and 42 sandwiched between transparent plates 11 and 12 on which are formed transparent electrodes 21 and 22 and orientation films 31 and 32, and the reflector 9. The liquid crystal gel is comprised of liquid crystals 5, dichroic dyes 60 and polymer threads 7 as shown in enlarged view in FIG. 3A.

The polymer threads are substantially orientated in one direction at each of the liquid crystal gel layers 41 and 42, with the directions at each of the liquid crystal gel layers 41 and 42 being orthogonal with respect to each other. The liquid crystals 5 and the dichroic dyes 60 are orientated along the polymer threads at each of the liquid crystal gel layers. According to this embodiment, a reflective liquid crystal display element of high reflectivity and high contrast ratio can be realized.

A method of manufacturing a reflective liquid crystal display element of the second embodiment will now be described with reference to FIG. 4.

(1) An orientation film 3 on the plate 1 equipped with the electrode 2 is rubbed. (2) Liquid crystals 5 with dichroic dye 60 added thereto and a small amount of pre-polymer 71 are applied onto the orientation film 3. If necessary, the processes (2) may be performed by heating the components and then cooling them gradually. (3) The pre-polymer 71 is polymerized by illumination with light 87. (4) This is then overlaid with another element made in the same way so that the directions of orientation of the liquid crystals are orthogonal. At this time, if the desired liquid crystal is again injected after the liquid crystal after polymerization is extracted, deterioration in the liquid crystal due to UV exposure can be prevented.

In this embodiment, when a voltage is applied, liquid crystal molecules in the vicinity of the orientation film are controled by anchoring caused by the orientation film and are difficult to align in the voltage direction. The reflectivity then becomes low because light is absorbed at this portion. An orientation film for vertical alignment is used as the orientation film and if the liquid crystal gel is made using the manufacturing method for the liquid crystal gel of the first embodiment (a method of polymerization using irradiation employing polarized light), the reflectivity can be improved by making the liquid crystal in the vicinity of the orientation film also become orientated in the direction of the voltage when a voltage is applied.

Figure 5:
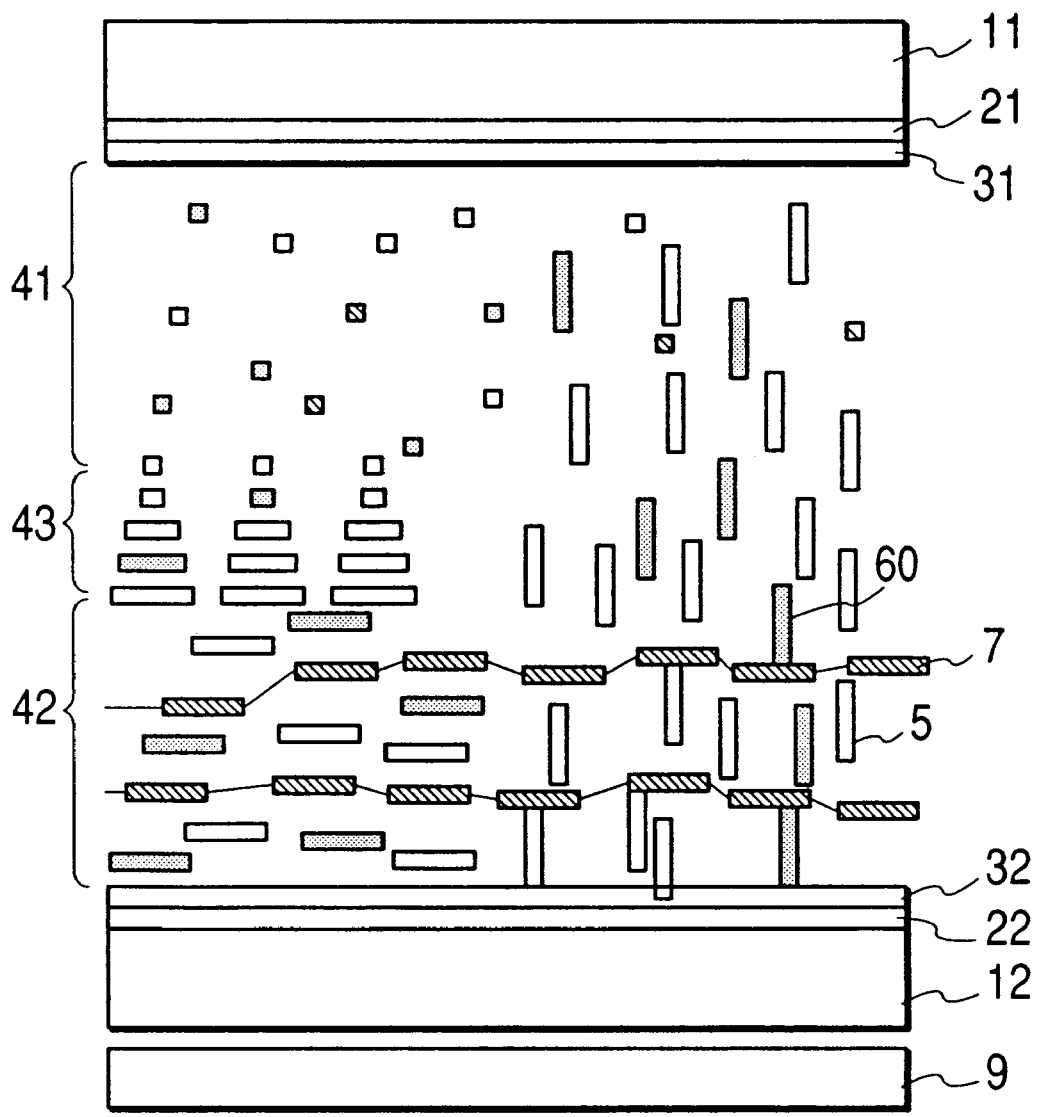
FIG. 5 is a schematic cross-sectional view showing the configuration of a liquid crystal display element representing a third embodiment of the present invention.

The configuration of a third embodiment of the present invention is shown in FIG. 5. This third embodiment comprises a two layer liquid crystal gel element of two liquid crystal gel layers 41 and 42 and a twisted liquid crystal layer 43 sandwiched between transparent plates 11 and 12 on which are formed transparent electrodes 21 and 22 and orientation films 31 and 32, and the reflector 9. The liquid crystal gel is comprised of liquid crystals 5, dichroic dye 60 and polymer threads 7. The twisted liquid crystal layer 43 is comprised of the liquid crystals 5 and the dichroic dye 60, with the polymer threads 7 not existing at this portion.

The polymer threads are substantially orientated in one direction at each of the liquid crystal gel layers 41 and 42, with the directions at each of the liquid crystal gel layers 41 and 42 being orthogonal with respect to each other. The liquid crystals 5 and the dichroic dyes 60 are orientated along the polymer threads at each of the liquid crystal gel layers. At the twisted liquid crystal layer 43 the liquid crystal molecules and the dichroic dyes are oriented so as to be twisted along a direction from the liquid crystal gel layer 41 to the liquid crystal gel layer 42.

If the twisted liquid crystal layer is sufficiently thin, this portion can be ignored from an optical point of view. It is preferable for the product $\Delta nd$ of the anisotropy $\Delta n$ of the refractive index of the liquid crystal and the (thickness of the) twisted liquid crystal layer d to be smaller than 0.3. According to this embodiment, a reflective liquid crystal display element of high reflectivity and high contrast ratio can be realized as with previous embodiments.

Figure 2:
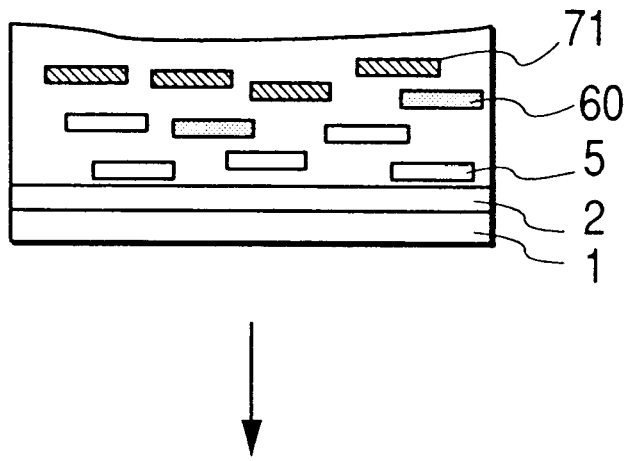
FIG. 2 is a flow diagram illustrating a method of manufacturing the liquid crystal display element of the first embodiment of the present invention.
Figure 2:
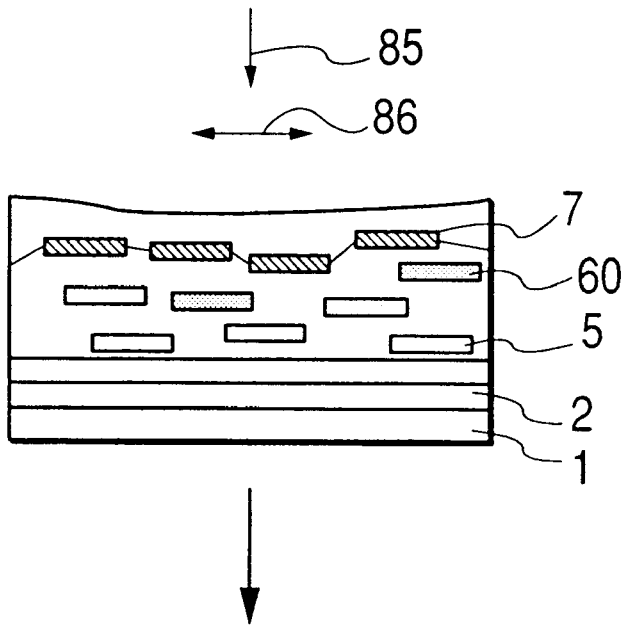
Figure 4:
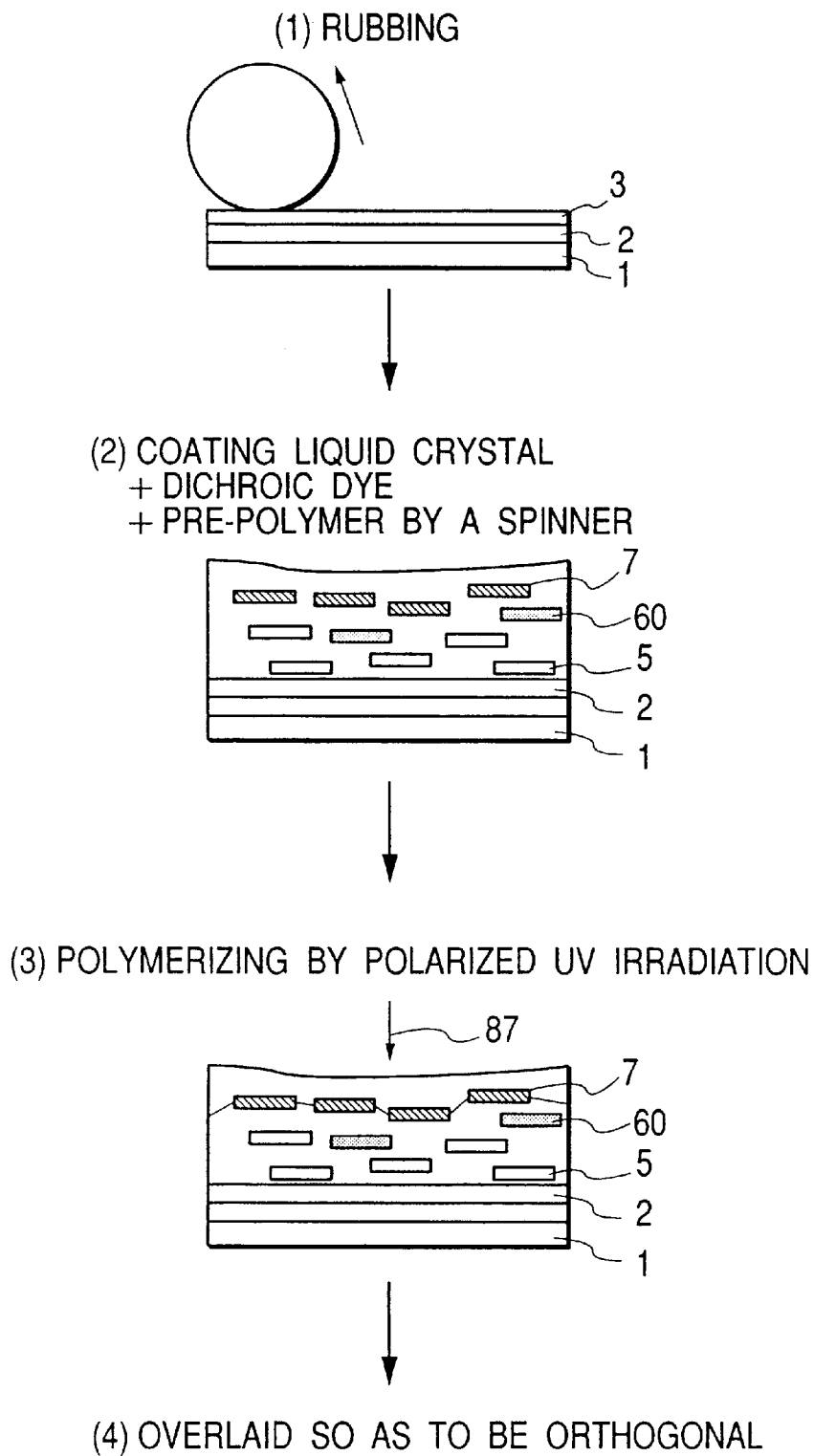
FIG. 4 is a flow diagram illustrating a method of manufacturing the liquid crystal display element of the second embodiment of the present invention.

The reflective liquid crystal display element of the third embodiment can be manufactured using the method of FIG. 2 or FIG. 4, but if the method of FIG. 2 is used, the orientation films 31 and 32 are not necessary.

Figure 6:
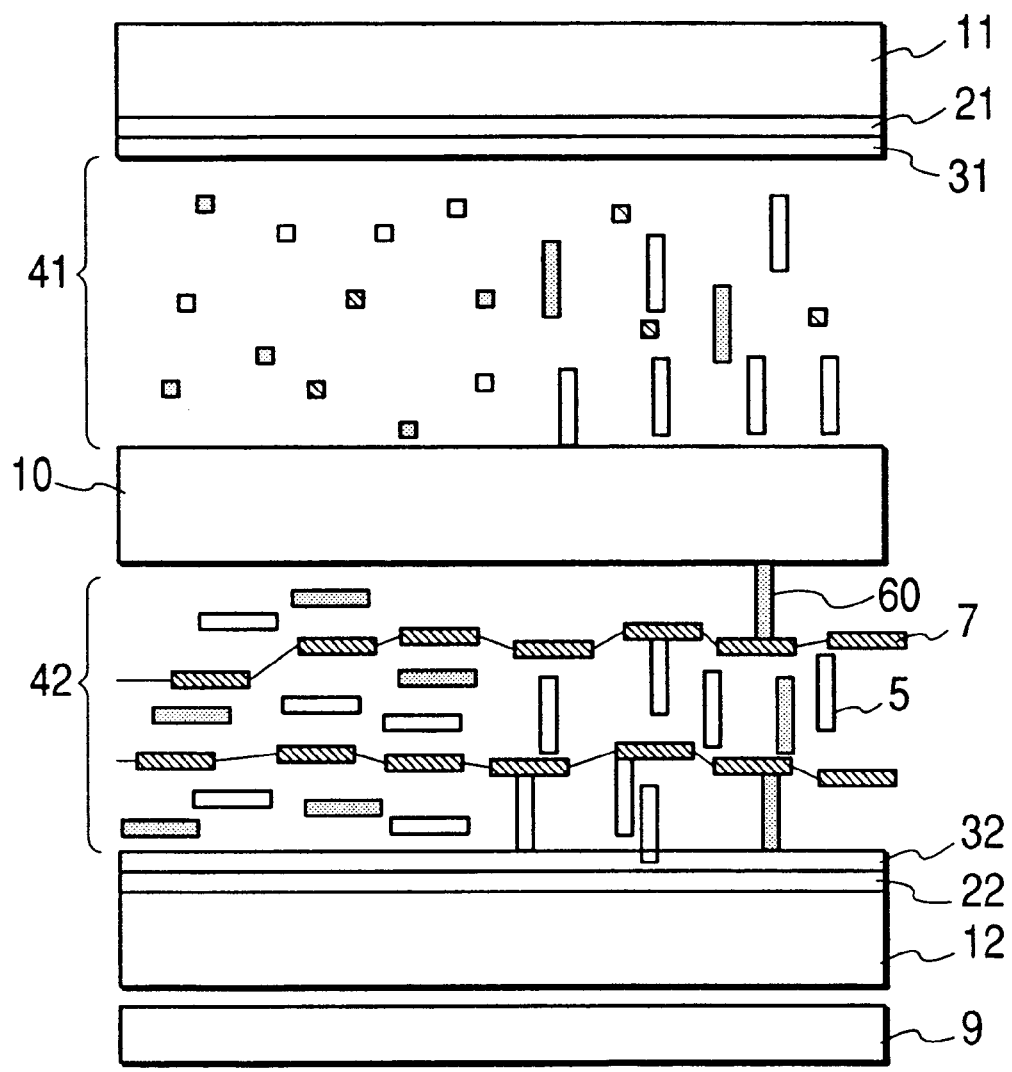
FIG. 6 is a schematic cross-sectional view showing the configuration of a liquid crystal display element representing a fourth embodiment of the present invention.

The configuration of a fourth embodiment of the present invention is shown in FIG. 6. This fourth embodiment comprises a two layer liquid crystal gel element of two liquid crystal gel layers 41 and 42 and a separation layer 10 sandwiched between transparent plates 11 and 12 on which are formed transparent electrodes 21 and 22 and orientation films 31 and 32, and the reflector 9. The liquid crystal gel is comprised of liquid crystals 5, dichroic dyes 60 and polymer threads 7. The separation layer 10 separates the liquid crystal gel layers 41 and 42.

The polymer threads are substantially orientated in one direction at each of the liquid crystal gel layers 41 and 42, with the directions at each of the liquid crystal gel layers 41 and 42 being orthogonal with respect to each other. The liquid crystals 5 and the dichroic dyes 60 are orientated along the polymer threads at each of the liquid crystal gel layers. If the separation layer 10 is sufficiently thin compared with the liquid crystal gel layer, driving presents no problems as almost all of the voltage across the transparent electrodes 21 and 22 is applied to the liquid crystal gel layers. It is preferable for the material for the separation layer 10 to be of a high dielectric constant. It is also preferable for the ratio $\epsilon p/dp$ of the dielectric constant $\epsilon p$ and the thickness dp of the separation layer to be ten times or more than the ratio $\epsilon 1/d1$ of the dielectric constant $\epsilon 1$ of the liquid crystal and the thickness $\alpha 1$ of the two layers of the liquid crystal gel layer so that a sufficient voltage is applied to the liquid crystal gel layer.

The reflective liquid crystal display element of the fourth embodiment can be made by laminating so as to sandwich the separation layer 10 using that made in the method of FIG. 2 or FIG. 4 as in the third embodiment.

Spacers can be inserted between the orientation films 31 and 32 of the first embodiment or between the electrodes 21 and 22 in the second to fourth embodiments in order to control the thickness of the liquid crystal gel. Polymer beads or fibers can be used as these spacers.

In the first to fourth embodiments, the same results are obtained with the reflector 9 between the plate 12 and the transparent electrode 22, or between the transparent electrode 22 and the orientation film 32. In these cases, the plate does not have to be a transparent material. The same results are also obtained if an electrode of aluminum etc. that reflects light is used in place of a transparent electrode. In this case, it is again not necessary for the plate 12 to be transparent. It is also possible to form pixel electrodes of aluminum etc. that reflect light and switching elements of, for example, TFTs (Thin Film Transistors) that are connected to these pixel electrodes on the plate 12 and then control the voltages of the pixel electrodes by turning the switching elements on and off.

If plastic is used as the plate in the first to fourth embodiments, a display element that is both lightweight and flexible can be obtained.

When there is no voltage applied in the first embodiment, as shown in the left half of FIG. 1, a component 81, which is incident natural light 8 and is parallel to the polymer threads, is absorbed at the liquid crystal gel layer 41. Further, a component 82 of light parallel to the polymer threads is also absorbed in a similar manner at the liquid crystal gel layer 42. Light reflected by a reflector 9 is also then absorbed by the liquid crystal gel layers 41 and 42 in the same manner. The light reflectivity which corresponds to the absorption wavelength of the dichroic dye is therefore an extremely low value.

When a voltage is applied, as shown in the right half of FIG. 1, the liquid crystals 5 and the dichroic dyes 60 become orientated in the direction of the voltage. In this case, the incident natural light 8 is mostly not absorbed because it's light component is orthogonal to the absorption axes of the dichromatic pigments. Light reflected by the reflector 9 is also similarly mostly not absorbed. Light reflectivity corresponding to the absorption wavelength of the dichroic dye therefore becomes an extremely high value.

According to the present invention, a high reflectivity and a high contrast ratio can be achieved.

In the first to fourth embodiments, the voltage of the electrode 22 can be controlled using a TFT formed on the plate 12 so as to drive the liquid crystal gel. Further, if a polymer liquid crystal is used as the polymer, a favorable orientation will be obtained and a high contrast ratio will be realized. The same high contrast ratio is also obtained when diacrylate polymers are used.

Figure 7:
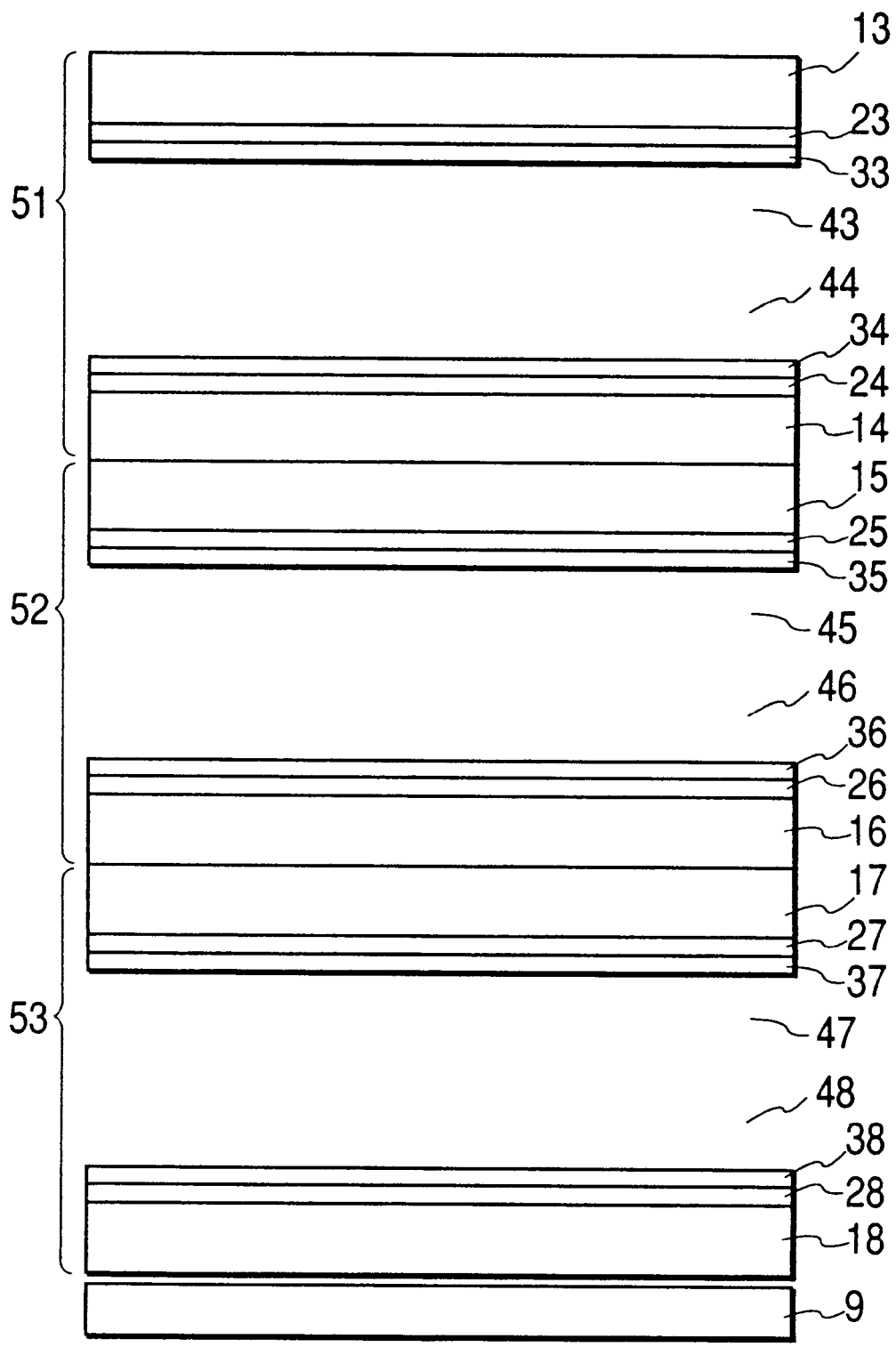
FIG. 7 is a schematic cross-sectional view showing the configuration of a liquid crystal display element representing a fifth embodiment of the present invention.

The configuration of a color reflective liquid crystal display element representing a fifth embodiment of the present invention is shown in FIG. 7. This fifth embodiment comprises a first two layer liquid crystal gel element 51 with two liquid crystal gel layers 43 and 44 sandwiched between transparent plates 13 and 14 on which are formed transparent electrodes 23 and 24, a second two layer liquid crystal gel element 52 with two liquid crystal gel layers 45 and 46 sandwiched between transparent plates 15 and 16 on which are formed transparent electrodes 25 and 26, a third two layer liquid crystal gel element 53 with two liquid crystal gel layers 47 and 48 sandwiched between transparent plates 17 and 18 on which are formed transparent electrodes 27 and 28, and the reflector 9. The liquid crystal gel layers 43 and 44 are comprised of liquid crystal, cyan-colored dichroic dye, and polymer threads. The liquid crystal gel layers 45 and 46 are comprised of liquid crystal, magenta-colored dichroic dye, and polymer threads. The liquid crystal gel layers 47 and 48 are comprised of liquid crystal, yellow-colored dichroic dye, and polymer threads.

At the liquid crystal gel layers 43, 44, 45, 46, 47 and 48 the polymer threads are oriented in substantially one direction and the directions of the polymer threads of the liquid crystal gel layers 43 and 44, liquid crystal gel layers 45 and 46 and liquid crystal gel layers 47 and 48 are each orthogonal with respect to each other. The liquid crystals and dichroic dyes are oriented along the polymer threads at each of the liquid crystal gel layers. When there is no voltage applied across the transparent electrodes 23 and 24, across the transparent electrodes 25 and 26 and across the transparent electrodes 27 and 28, the liquid crystal gel elements 51, 52 and 53 are only transparent to cyan, magenta and yellow, respectively, and as these colors are a subtractive color mixture, reflected light will appear to be black. On the other hand, when a voltage is applied across the transparent electrodes 23 and 24, the transparent electrodes 25 and 26 and the transparent electrodes 27 and 28, light is not absorbed at the liquid crystal gel elements 51, 52 and 53 and reflected light will appear to be white. Arbitrary colors can then be displayed by changing combinations in which voltages are applied across the transparent electrodes 23 and 24, 25 and 26, and 27 and 28. According to this embodiment, a color reflective liquid crystal display element having high reflectivity and having a high contrast ratio can be realized.

When the pixel size is large compared with the thickness of the plates 14, 15, 16, 17 and 18 with the configuration of the fifth embodiment, color shifts occur due to transmission of incident or reflected light at portions corresponding to different pixels of the liquid crystal gel elements 51, 52 and 53. This problem can be resolved by using optical fiber plates made by bundling together and then cutting a large number of optical fibers as the plates 14, 15, 16, 17 and 18.

The same results can be obtained even if the liquid crystal gel elements 51, 52 and 53 of the fifth embodiment are given the configurations of the liquid crystal gel elements of the second, third or fourth embodiments. The same results are also obtained if the plates 14 and 15, and 16 and 17 of the fifth embodiment are formed as single bodies.

Further, the same results are also obtained in the fifth embodiment if the reflector 9 is between the plate 18 and the transparent electrode 28, although in this case it is not necessary for the plate 18 to be a transparent member.

The same results are also obtained in the fifth embodiment if an electrode that reflects light, such as an aluminum electrode etc., is used in place of a transparent electrode. In this case, it is not necessary for the plate 18 to be a transparent member.

Reflective liquid crystal display elements capable of displaying in color can be realized by overlaying the usual kind of transmission liquid crystal display elements of the first to fourth embodiments with color filters.

The liquid crystal display of the present invention as described above is useful as a reflective liquid crystal display that is bright and has a high contrast ratio. If the present invention is used as a display for portable information equipment, a backlight will not be required and the power consumption will be low. The battery usage time can therefore be dramatically improved.

What is claimed is:

1. A liquid crystal display comprising:
   a pair of plates having electrodes on opposing surfaces thereof, at least one of said plates being transparent; and
   a continuous liquid crystal layer sandwiched between said pair of plates, said liquid crystal layer having first and second liquid crystal gel layers each with polymer threads aligned in a fixed direction within a dichroic liquid crystal,
   with a direction of orientation of the polymer threads included in said first liquid crystal gel layer and a direction of orientation of the polymer threads included in said second liquid crystal gel layer being orthogonal with respect to each other.

2. The liquid crystal display of claim 1, wherein the liquid crystal comprising said liquid crystal layer is a nematic liquid crystal.

3. The liquid crystal display of claim 2, wherein dichroic dye is mixed within the liquid crystal of said first and second liquid crystal gel layers.

4. The liquid crystal display of claim,1, wherein said polymer threads are polymer liquid crystals.

5. The liquid crystal display of claim 1, wherein said polymer threads are diacrylate polymers.

6. The liquid crystal display of claim 1, wherein said electrodes formed on said pair of plates are transparent electrodes.

7. The liquid crystal display of claim 6, wherein a reflector is formed on one of said plates.

8. The liquid crystal display of claim 1, wherein the electrode formed on said transparent plate of said pair of plates is a transparent electrode and the electrode formed on the remaining plate is a reflective electrode.

9. The liquid crystal display of any one of claims 1 to 8, wherein each of said plates has an orientation film.

10. The liquid crystal display of claim 9, wherein directions of orientation of said orientation films are orthogonal with respect to each other.

11. The liquid crystal display of any one of claims 1 to 8, wherein said liquid crystal layer has an intermediate layer between said first and second liquid crystal gel layers.

12. The liquid crystal display of claim 11, wherein said polymer threads do not exist at said intermediate layer and said liquid crystal is a twisted liquid crystal layer.

13. The liquid crystal display of claim 12, wherein a product $\Delta nd$ of anisotropy $\Delta n$ of the refractive index of said twisted liquid crystal layer and thickness d is 0.3 or less.

14. The liquid crystal display of claim 11, wherein a ratio $\epsilon p/dp$ of a dielectric constant $\epsilon p$ and a thickness dp of said intermediate layer is ten times or more than a ratio $\epsilon 1/d1$ of a dielectric constant $\epsilon 1$ of said liquid crystal gel layer and a thickness d1 of the two layers.

15. The liquid crystal display of any one of claims 1 to 8, wherein a switching element is formed on one of said pair of plates in such a manner as to be connected to said electrode formed on said one plate, and said electrode potential is controlled by turning on and off of said switching element.

16. The liquid crystal display of claim 15, wherein said electrode formed on said one plate is a reflective electrode.

17. The liquid crystal display of claim 1, wherein the first and second liquid crystal gel layers are in contact with one another.

18. The liquid crystal display of claim 1, wherein said pair of plates and said liquid layer sandwiched between said pair of plates form a liquid crystal gel element, a plurality of said liquid crystal gel elements being provided and layered one on top of another.

19. The liquid crystal display of claim 18, wherein both plates of said pairs of plates are transparent, and light absorption wavelengths of liquid crystal layers of said liquid crystal gel elements are different.

20. A color liquid crystal display comprising:
   a plurality of liquid crystal gel elements each having: a pair of transparent plates having electrodes on opposing surfaces thereof; and a continuous liquid crystal layer sandwiched between said pair of plates, said liquid crystal layer having first and second liquid crystal gel layers each with polymer threads aligned in fixed directions within a dichromatic liquid crystal, with a direction of orientation of the polymer threads included in said first liquid crystal gel layer and a direction of orientation of the polymer threads included in said second liquid crystal gel layer being orthogonal with respect to each other, and with said plurality of liquid crystal gel elements being layered one on top of another, wherein light absorption wavelengths of liquid crystal layers of said liquid crystal gel elements are different.

21. The color liquid crystal display of claim 20, wherein said plates comprise fiber plates.

22. The color liquid crystal display of claim 20 or 21, wherein dichroic dye is mixed within liquid crystal of said first and second liquid crystal gel layers.

23. The color liquid crystal display of claim 20 or 21, wherein there are three layers of said liquid crystal gel elements, with dichroic elements used at each layer representing cyan, magenta and yellow, respectively.

24. The liquid crystal display of claim 20, wherein the first and second liquid crystal gel are in contact with one another.

25. A method of manufacturing a liquid crystal display element comprising the steps of:
   carrying out a process for deciding an orientation state of a liquid crystal on side surfaces of plates where electrodes are present;
   applying a dichroic nematic liquid crystal having positive dielectric anisotropy and a photopolymerizable pre-polymer mixture to said processed surfaces of said plates;
   providing exposure to light so that said pre-polymer is polymerized; and
   pasting said pair of plates thus obtained together in such a manner as to have orientation processing directions of the polymerized pre-polymer that are orthogonal with respect to each other and a continuous liquid crystal layer between said pair of plates.

26. A method of manufacturing a liquid crystal display element comprising the steps of:
   applying a dichroic nematic liquid crystal having positive dielectric anisotropy and a photopolymerizable pre-polymer mixture to polymerized in a specific direction using polarized light to plates having electrodes;
   providing exposure to polarized light so that said pre-polymer is polymerized; and
   pasting said pair of plates thus obtained together in such a manner as to have orientation processing directions of the polymerized pre-polymer that are orthogonal with respect to each other and a continuous liquid crystal layer between said pair of plates.

* * * * *